United States Patent [19]
Demissy

[11] Patent Number: 5,186,067
[45] Date of Patent: Feb. 16, 1993

[54] MECHANISM FOR CONVERTING ROTARY MOTION INTO TRANSLATION MOTION

[75] Inventor: Daniel Demissy, Montreal, Canada

[73] Assignee: GEC Alsthom Energie Inc., Laprairie, Canada

[21] Appl. No.: 796,355

[22] Filed: Nov. 22, 1991

[30] Foreign Application Priority Data

Nov. 23, 1990 [FR] France .................. 90 14627

[51] Int. Cl.⁵ .................. F16H 25/08; F16H 55/02
[52] U.S. Cl. .................. 74/424.6; 74/89.14; 74/458
[58] Field of Search .......... 74/89.14, 424.6, 458; 24/274 R

[56] References Cited

U.S. PATENT DOCUMENTS

| | | | |
|---|---|---|---|
| 1,181,971 | 5/1916 | Lovell | 74/458 |
| 1,492,266 | 4/1924 | Ray | 74/458 |
| 2,131,261 | 9/1938 | Aldeen et al. | 74/424.6 |
| 3,924,308 | 12/1975 | Duprez | 24/274 R |
| 4,077,268 | 3/1978 | Hill | 74/89.15 |
| 4,187,933 | 2/1980 | Calabrese et al. | 188/134 |
| 4,226,129 | 10/1980 | Henderson | 74/89.15 |
| 4,257,149 | 3/1981 | Sydendal | 24/274 R |

FOREIGN PATENT DOCUMENTS 3320889  12/1983  Fed. Rep. of Germany.

OTHER PUBLICATIONS

Patent Abstracts of Japan, vol. 5, No. 101 (M-76)(773) Jun. 30, 1981 & JP-A-56 46159 (AI TEII ERU) Apr. 27, 1981.

Primary Examiner—Allan D. Herrmann
Attorney, Agent, or Firm—Sughrue, Mion, Zinn, Macpeak & Seas

[57] ABSTRACT

The present invention provides a mechanism for converting rotary motion into translation motion, the mechanism comprising a first member which is rotated and which is constituted by a cylinder having a helical spring threaded thereover and fixed thereto at at least one point, and a second member for being driven in translation by the first member and including slots for co-operating with the thread constituted by the spring. This transmission system is intended, in particular, for use in relatively rudimentary mechanisms of the type used in agricultural machinery.

6 Claims, 1 Drawing Sheet

MECHANISM FOR CONVERTING ROTARY MOTION INTO TRANSLATION MOTION

The present invention relates to a mechanism for converting rotary motion into translation motion.

BACKGROUND OF THE INVENTION

Such mechanism are generally constituted by a rack associated with a worm screw or with a gear wheel. The worm screw or gear wheel is rotated and it has its thread or its teeth meshing with the notches in the rack which is thus driven in translation.

In general, such transmission components require relatively complex and accurate machining in order to obtain a correct fit between the thread or the teeth and the notches of the rack.

For relatively rudimentary mechanisms, such as those used in agricultural machinery, it is not necessary to achieve highly accurate transmission, and it therefore appears that such components are relatively expensive compared with the use to which they are put.

An object of the invention is to provide a transmission system for use in particular in relatively rudimentary mechanisms of the type used in agricultural machines and which are of reduced cost while being very robust.

In addition, by construction, the transmission system of the invention does not require its components to be made highly accurately because there is a degree of flexibility in the way the components co-operate, as explained below.

The system of the present invention is particularly simple, both in structure and in the way it is made.

SUMMARY OF THE INVENTION

The present invention provides a mechanism for converting rotary motion into translation motion, the mechanism comprising a cylindrical first member that is driven in rotation and is provided with an outside thread, and a second member designed to be driven in translation by the first member and including notches for co-operating with the outside thread of the first member.

The mechanism is remarkable in that the first member is constituted by a cylinder over which a flat section helical spring is threaded and is fixed thereto at least one point, the inside diameter of the spring being substantially equal to the outside diameter of the cylinder, and in that the second member is a hollow cylinder provided with slots that are offset in the longitudinal direction of the cylinder, said slots being centered on a generator line thereof, being inclined at the angle of inclination of the turns of the spring, and being spaced apart at a pitch substantially equal to the pitch of the turns of the spring.

This way of implementing a "worm screw and rack" mechanism is particularly simple and cheap. It does not require any accurate machining either for the first member or for the second member, as is essential for conventional transmission system.

The mechanism obtained in this way can provide a particularly high ratio of inlet velocity to outlet velocity.

The flat section of the spring provides effective and reliable axial thrust that cannot be obtained with a round spring, and in addition, because of its resilience, the spring adapts to the slots in the second member, thereby spreading thrust over a large surface area and providing effective transmission.

There is no need for the slots in the hollow cylinder that constitutes the second member to be made with great accuracy.

Since the turns of the spring adapt to the disposition of the slots, any possible inaccuracy in the pitch between the slots can be taken up by the resilience of the spring, while nevertheless retaining good stress distribution.

The second member is light and extremely simple in structure. Its slots may be made, for example, merely by milling lines in the hollow cylinder.

Preferably the cylinder of the first member is hollow, thereby making it possible to obtain a transmission member that is relatively light.

The fixing between the spring and the cylinder is preferably by welding, and preferably at least at the ends of the spring.

When the spring is fixed to the cylinder by its ends only, a high degree of freedom is obtained, enabling the turns of the cylinder to adapt to the disposition of the notches in the second member.

To stiffen the worm screw obtained in this way somewhat, the number of fixing points may be increased, e.g. at a pitch corresponding to a multiple of the spring pitch.

In order to enable it to be guided in translation by an external part, the cylinder of the second member may be provided with at least one stud.

For example, the stud may co-operate with a rectilinear groove running parallel to the longitudinal axis of the second member and formed in an external support part.

BRIEF DESCRIPTION OF THE DRAWING

An embodiment of the invention is described by way of example with reference to the accompanying drawing, in which.

DETAILED DESCRIPTION

Figures 1, 2:
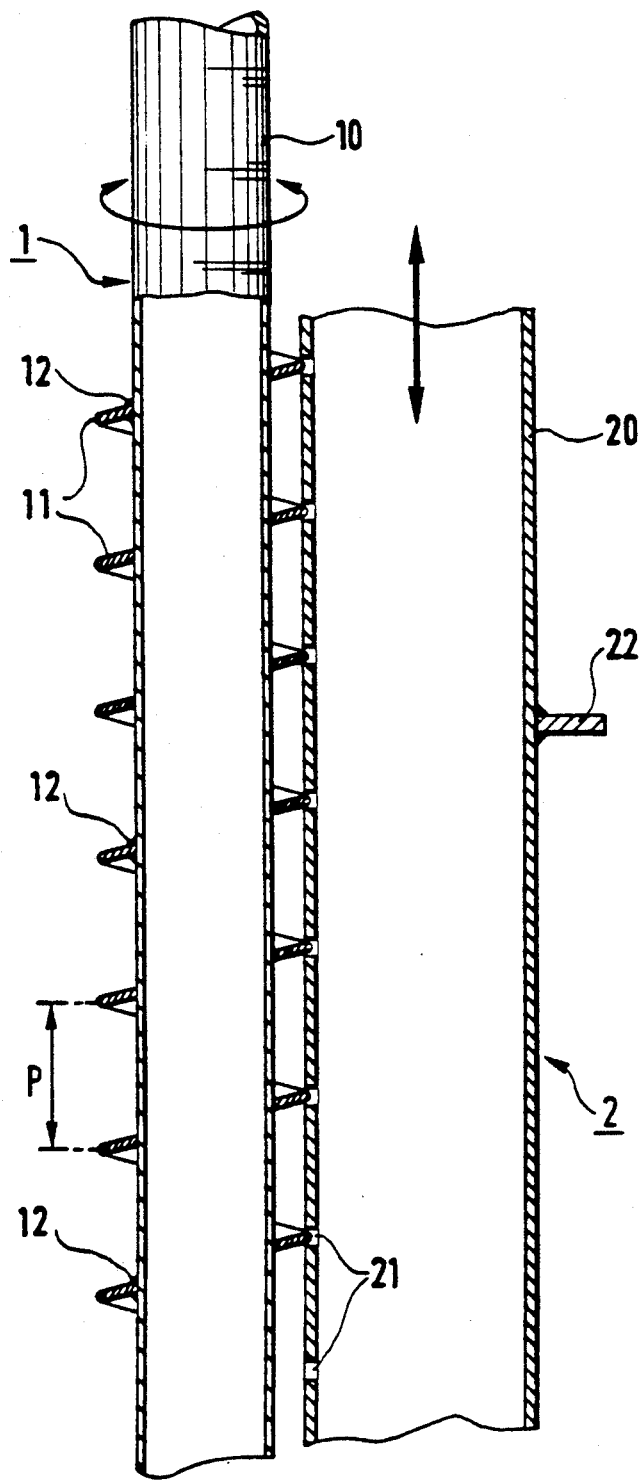
FIG. 1 is a longitudinal section through a mechanism of the present invention.
FIG. 2 is a fragmentary perspective view of the second member of a mechanism of the invention.

The mechanism for converting rotary motion into translation motion comprises a rotary member 1 acting as a worm screw and a member 2 which is driven in translation by rotation of the first member 1.

The first member 1 comprises a hollow cylinder 10 having a flat section helical spring 11 threaded thereover. The spring 11 is fixed, at least at its ends, to the cylinder 10.

It may be locally fixed at 12 as shown in FIG. 1 at a pitch equal to a multiple of the pitch of the spring 11, with the fixing pitch being equal to three times the pitch of the spring 11 in the example shown. The fixing is preferably performed by welding.

The second member 2 is driven in translation by co-operation between the turns of the spring 11 and a plurality of slots 21 formed in a hollow cylinder 20. The disposition of the slots 21 can be seen particularly clearly in FIG. 2. The slots are offset in the longitudinal direction of the cylinder 20, and they are inclined at the angle of inclination of the turns of the spring 11. The slots are slightly wider than the thickness of the flat strip constituting the spring 11, thereby enabling the a plurality, turns of the spring 11 to simultaneously engage respective of slight differences of pitch between the turns of the spring and the slots 21 of the hollow cylinder 20 slots 21.

The distance between slots 21 is substantially equal to the pitch P of the turns of the spring 11. As explained above, it is not necessary for the slots 21 to be disposed very accurately, since the spring 11 is sufficiently resilient to adapt to possible dimensional errors.

In addition, the second member 2 is provided with at least one stud 22 for guiding it in translation by cooperating with an external part, e.g. via a groove. The guidance may be achieved by any other equivalent means.

I claim:

1. In a mechanism for converting rotary motion into translation motion, the mechanism comprising a cylindrical first member that is driven in rotation and is provided with an outside thread, and a second member designed to be driven in translation by the first member and including notches for engaging with the outside thread of the first member, the improvement wherein the first member is constituted by a first cylinder over which a flat section helical spring is threaded and is fixed locally to the outer periphery of said first cylinder at at least one point and otherwise is free of said first cylinder and forms a plurality of longitudinally spaced turns of a given pitch, and the inside diameter of the spring being substantially equal to the outside diameter of the first cylinder, and wherein the second member is a hollow second cylinder provided with a plurality of slots that are offset in the longitudinal direction of the cylinder, said plurality of slots being centered on a generator line thereof, being inclined at an angle of inclination of the turns of the spring, and being spaced apart at a pitch substantially equal to the pitch of the turns of the spring, whereby a plurality of the turns of the spring simultaneously engage respective slots of the hollow second cylinder irrespective of slight differences in pitch between the turns of the spring and the slots of the hollow second cylinder.

2. A mechanism according to claim 1, wherein the first cylinder is hollow.

3. A mechanism according to claim 1, wherein the local fixing of the spring to the first cylinder is at least at opposite ends of the helical spring.

4. A mechanism according to claim 1, wherein the spring is locally welded to the first cylinder at said at least one end.

5. A mechanism according to claim 1, wherein the second cylinder is provided with means for guiding said second cylinder in translation along the axis of said second cylinder.

6. A mechanism according to claim 5, wherein the means for guiding the second cylinder in translation is constituted by at least one stud projecting radially outward of said second cylinder for engagement with a part external of said second cylinder.

* * * * *